US011345360B1

(12) United States Patent
Kaiser et al.

(10) Patent No.: US 11,345,360 B1
(45) Date of Patent: May 31, 2022

(54) LOCALIZATION ERROR HANDLING

(71) Applicant: Zoox, Inc., Foster City, CA (US)

(72) Inventors: Nathaniel Jon Kaiser, Foster City, CA (US); Brice Rebsamen, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 168 days.

(21) Appl. No.: 16/712,753

(22) Filed: Dec. 12, 2019

(51) Int. Cl.
*B60W 50/02* (2012.01)
*G06N 20/00* (2019.01)
*G05D 1/00* (2006.01)
*B60W 10/04* (2006.01)
*B60W 10/20* (2006.01)
*B60W 50/08* (2020.01)
*B60W 30/18* (2012.01)
*B60W 50/00* (2006.01)

(52) U.S. Cl.
CPC ........ *B60W 50/0225* (2013.01); *B60W 10/04* (2013.01); *B60W 10/20* (2013.01); *B60W 30/18* (2013.01); *B60W 50/08* (2013.01); *G05D 1/0088* (2013.01); *G06N 20/00* (2019.01); *B60W 2050/007* (2013.01); *B60W 2710/20* (2013.01); *B60W 2720/106* (2013.01); *G05D 2201/0213* (2013.01)

(58) Field of Classification Search
CPC .. B60W 50/0225; B60W 30/18; B60W 50/08; B60W 10/20; B60W 10/04; B60W 2720/106; B60W 2710/20; B60W 2050/007; G05D 1/0088
See application file for complete search history.

(56) References Cited

U.S. PATENT DOCUMENTS

| 9,612,123 | B1 | 4/2017 | Levinson et al. |
| 10,353,390 | B2 | 7/2019 | Linscott et al. |
| 10,466,700 | B1* | 11/2019 | Carmack ................ H04K 3/224 |
| 10,782,685 | B1* | 9/2020 | Sucan ............... B60W 50/0225 |
| 11,022,971 | B2* | 6/2021 | Della Penna .......... G07C 5/085 |
| 2010/0280699 | A1* | 11/2010 | Bageshwar .......... G05D 1/0231 |
| | | | 701/26 |
| 2017/0199523 | A1* | 7/2017 | Barton-Sweeney ........................ |
| | | | B60W 60/0011 |
| 2018/0164827 | A1* | 6/2018 | Chu ...................... G05D 1/0248 |
| 2018/0188031 | A1* | 7/2018 | Samper ................. B60W 10/20 |
| 2019/0016285 | A1* | 1/2019 | Freienstein ........... B60R 21/013 |
| 2019/0049242 | A1 | 2/2019 | Adams et al. |
| 2019/0049566 | A1 | 2/2019 | Adams et al. |
| 2019/0220012 | A1* | 7/2019 | Zhang ................... B60W 30/08 |

(Continued)

*Primary Examiner* — Peter D Nolan
*Assistant Examiner* — Tanya C Sienko
(74) *Attorney, Agent, or Firm* — Lee & Hayes, P.C.

(57) ABSTRACT

Localization error handling using output is described. A computing system associated with a vehicle can receive sensor data from a sensor associated with vehicle. The computing system can determine, based at least partly on the sensor data, a first instruction for controlling the vehicle during a first period of time and a difference in pose information associated with a pose of the vehicle. Based at least partly on determining the difference, the computing system can retrieve a second instruction for controlling the vehicle during a second period of time prior to the first period of time and, based at least partly on comparing the first instruction and the second instruction, the computing system can determine whether the vehicle is to follow the first instruction or perform an alternate operation.

20 Claims, 5 Drawing Sheets

(56) References Cited

U.S. PATENT DOCUMENTS

| | | | |
|---|---|---|---|
| 2019/0271549 A1* | 9/2019 | Zhang | G05D 1/0088 |
| 2020/0025575 A1* | 1/2020 | Weissman | G01S 13/751 |
| 2020/0068781 A1* | 3/2020 | Hershbarger | G05D 1/0276 |
| 2020/0377078 A1* | 12/2020 | Liu | B60W 30/12 |
| 2021/0171020 A1* | 6/2021 | Sugano | B60W 50/0225 |

* cited by examiner

LOCALIZATION ERROR HANDLING

BACKGROUND

Localization is the process by which an entity determines its location in its environment. That is, by localizing itself, an entity, such as a vehicle, can determine its precise relationship to elements on a map associated with the environment within which the entity is positioned. When used in robotic applications, such as autonomous vehicles, errors in localization can cause catastrophic events.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
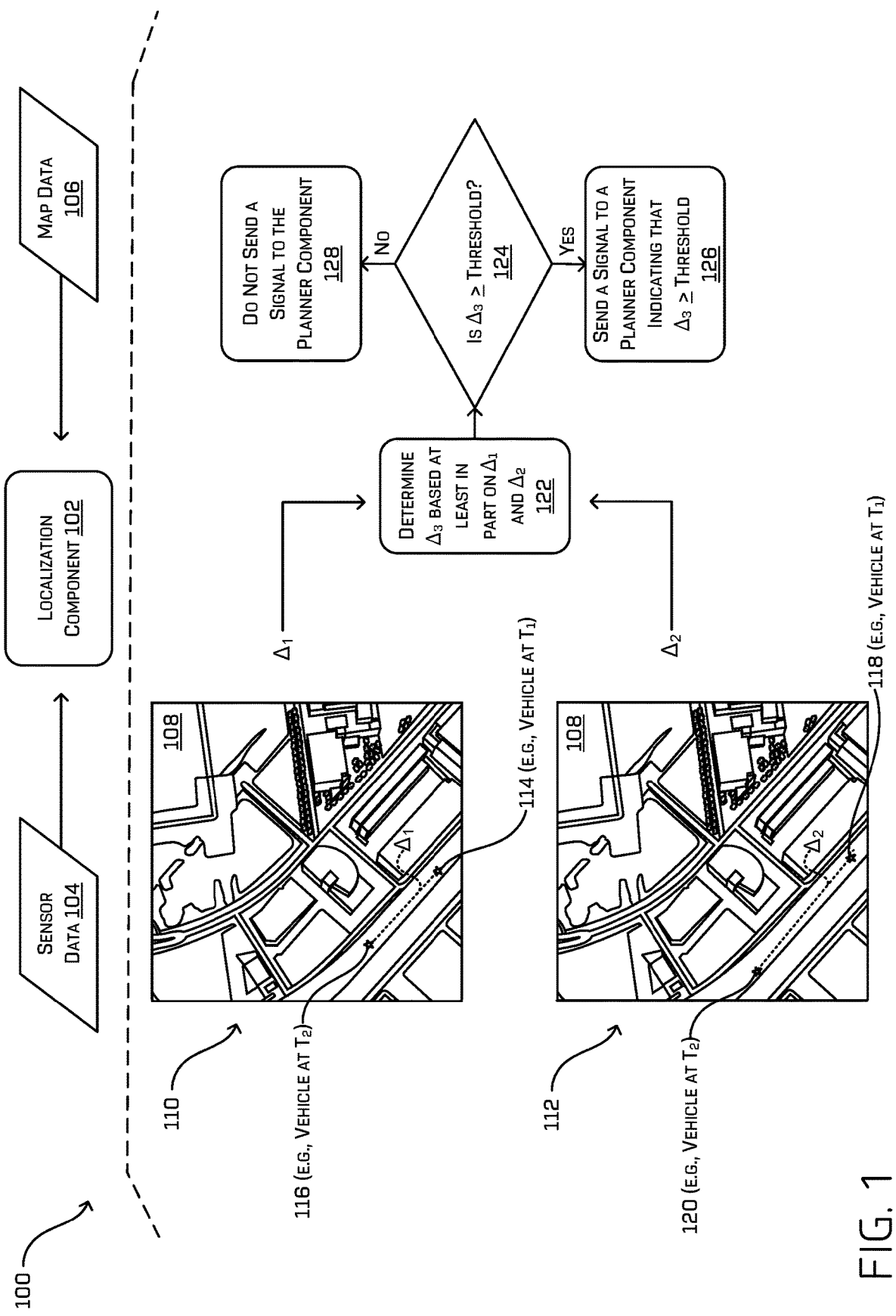
FIG. 1 illustrates an example environment for determining whether to use output from a planner component of a vehicle for localization error handling, as described herein.

Techniques described herein relate to localization error handling using output from a planner component of an entity, such as a vehicle. In at least one example, a localization component of an entity, such as a vehicle, can determine a current pose (e.g., position and/or orientation) of the vehicle. In at least one example, the localization component can determine an inconsistency between the current pose and a previous pose (e.g., when comparing different coordinate frames, as described below). If the inconsistency is significant enough (e.g., satisfies a threshold), the localization component can send a signal to a planner component associated with the vehicle. The signal can indicate that the inconsistency in pose is larger than an acceptable amount and as such, the planner component can compare a current output of the planner component with a previous (e.g., last) output of the planner component to determine a difference between the current output and the previous output. If the difference is less than a threshold, the planner component can determine to control the vehicle based on the current output without regard to the inconsistency in pose information. That is, the planner component can cause the vehicle to travel along a trajectory associated with the current output. However, if the difference is greater than or equal to the threshold, the planner component can cause the vehicle to perform an alternate operation (e.g., handover to a safety driver, send a notification to a remotely-located teleoperator, perform a safety maneuver, transition from an autonomous mode to a non-autonomous mode, etc.). In at least some examples, multiple thresholds can be used. As a non-limiting example, when used on an autonomous vehicle, there may be more sensitivity with respect to lateral deviations than with respect to longitudinal deviations. In such examples, a lateral threshold may be set to be lower than a longitudinal one.

In at least one example, a vehicle can utilize a localization component to determine the position, orientation, etc. (e.g., "pose") of the vehicle relative to map(s) of the environment of the vehicle. In some examples, the vehicle can utilize multiple, different coordinate frames in determining the pose of the vehicle. For example, the vehicle can use a global coordinate frame (e.g., based on data from a Global Positioning System (GPS)), a local coordinate frame (e.g., using sensor data received by sensor system(s) onboard the vehicle and/or map data associated with the environment of the vehicle), etc. In at least one example, the localization component can output inconsistent pose information, which can be caused by the localization component producing incorrect estimates for a period of time and then, in a short period of time, correcting itself (e.g., causing a "jump"). This causes an inconsistency in pose information that can affect operations of the vehicle, especially, for example, in autonomous vehicles.

In existing technology, inconsistencies in pose information can cause computing device(s) associated with a vehicle to disengage until the vehicle can determine—with more certainty—the pose of the vehicle. In semi-autonomous vehicles, a safety driver can monitor such inconsistencies and can maneuver such semi-autonomous vehicles in view of such inconsistencies. However, in fully autonomous vehicles, such vehicles are often required to pull over to the side of a highway or a congested area, which can raise safety concerns. That is, because the vehicle is unable to localize itself in view of the inconsistencies, the vehicle is not able to continue driving (e.g., autonomously) until the localization inconsistencies are resolved (e.g., fall below a threshold such that the inconsistency is acceptable).

Techniques described herein relate to using output from a planner component on the vehicle to enable the vehicle to continue driving even when localization inconsistencies arise. As an example, if a vehicle is driving on a straight section of a highway, there may not be many features for the vehicle to use to localize. Accordingly, there can be longitudinal jumps that can be large enough, with previous technologies, to cause a vehicle to disengage computing device(s) associated with the vehicle (e.g., to transition from an autonomous mode to a non-autonomous mode). However, using techniques described herein, a comparison of a current output from the planner component with a previous output from the planner component may produce a very small difference (e.g., in a local coordinate frame). For example, in both outputs, the vehicle can be instructed to drive straight at a constant speed for the next n seconds. As such, because the difference between outputs is very small (or nonexistent), the vehicle can be controlled based on the current output without regard to the longitudinal jumps.

In another example, a vehicle can be driving toward an intersection in a densely populated urban city. Because there can be many features for the vehicle to use to localize, there may not be many jumps expected and/or an expected magnitude of jumps may be relatively small. Nevertheless, jumps can happen. For example, the localization component can output a pose that indicates a jump near an intersection that the vehicle is to stop or turn out. Using techniques described herein, a comparison of a current output from the planner component with a previous output from the planner component may produce a significant difference. For example, when the vehicle is away from the intersection the output (previous) may instruct the vehicle to cruise at a constant speed, but as the vehicle approaches the intersection the output (current) may instruct the vehicle to decelerate and possibly turn. As such, because the difference between the outputs is significant, the vehicle may perform an alternate operation (e.g., other than being controlled based on the current output). In some examples, the alternate operation can comprise handing over control of the vehicle to a safety driver, sending a notification to a remotely-located teleoperator, performing a safety maneuver, transitioning from an autonomous mode to a non-autonomous mode, etc.

Techniques described herein provide various technical and/or operational benefits to vehicles, such as autonomous vehicles or other robotic platforms. For example, by utilizing outputs from a planner component on a vehicle, techniques described herein offer a more sophisticated "check" on localization than is present with current techniques. That is, the planner component provides context to localization that is not used in current techniques. The context provided by the planner component can enable a vehicle to determine whether it needs to disengage computing device(s) associated with a vehicle and/or cause the vehicle to pull over to the side of a highway or a congested area. That is, by leveraging the context made available by accessing outputs of the planner component, the vehicle is able to continue driving (e.g., autonomously) even though the localization inconsistencies are not yet resolved (e.g., fall below a threshold such that the inconsistency is acceptable).

In addition to providing a more sophisticated "check," techniques described herein enable vehicles to handle inconsistencies in localization more safely. That is, by leveraging context made available by accessing outputs of the planner component and enabling the vehicle to continue driving instead of pulling over to the side of a highway or congested area, for example, techniques described herein enable autonomous vehicles to more safely drive within an environment.

Techniques described herein can be implemented in a number of ways. Example implementations are provided below with reference to the following figures. Example implementations are discussed in the context of autonomous vehicles; however, the methods, apparatuses, and systems described herein can be applied to a variety of systems (e.g., a sensor system or a robotic platform), and are not limited to autonomous vehicles. Additionally, the techniques described herein can be used with real data (e.g., captured using sensor(s)), simulated data (e.g., generated by a simulator), or any combination of the two.

FIG. 1 illustrates an example environment 100 for determining whether to use output from a planner component of a vehicle for localization error handling, as described herein.

In at least one example, a vehicle can be driving within an environment. In at least one example, the vehicle can be an autonomous vehicle. An autonomous vehicle can be configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since an autonomous vehicle can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled.

In at least one example, the localization component 102 can include functionality to receive sensor data 104 from sensor system(s) associated with the vehicle to determine a position and/or orientation (e.g., "pose") of the vehicle (e.g., one or more of an x-, y-, z-position, roll, pitch, or yaw). Such sensor system(s) can include, but are not limited to, light detection and ranging (lidar) sensors, radio detection and ranging (radar) sensors, ultrasonic transducers, sound navigation and ranging (sonar) sensors, location sensors (e.g., global positioning system (GPS), compass, etc.), inertial sensors (e.g., inertial measurement units, accelerometers, magnetometers, gyroscopes, etc.), cameras (e.g., red, green blue (RGB), infrared (IR), intensity, depth, etc.), wheel encoders, environment sensors (e.g., temperature sensors, humidity sensors, light sensors, pressure sensors, etc.), Time of Flight (ToF) sensors, etc.

In at least one example, the localization component 102 can include and/or request/receive map data 106 associated with a map of an environment and can continuously determine a location and/or orientation of the vehicle within the map. A map can be any number of data structures that are capable of providing information about an environment, such as, but not limited to, topologies (such as junctions, lanes, merging zones, etc.), streets, mountain ranges, roads, terrain, and the environment in general. Maps can be associated with real environments or simulated environments.

In some examples, the localization component 102 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the vehicle. In some instances, the localization component 102 can provide data to various components of the vehicle to determine an initial position of a vehicle for generating a trajectory. Additional details associated with such a component (i.e., the localization component 102) are described in U.S. patent application Ser. No. 15/675,487, filed on Aug. 11, 2017, which is related to U.S. patent application Ser. No. 15/674,853, filed on Aug. 11, 2017, the entire contents of both of which are incorporated by reference herein.

FIG. 1 includes a top view of an example environment 108 within which the vehicle can be driving or otherwise positioned. Two instances of the top view of the example environment 108 are shown. Each instance can be associated with a different coordinate frame. For example, the first instance 110 can be associated with a local coordinate frame and the second instance 112 can be associated with a global coordinate frame. In at least one example, different localization techniques can be used for localizing the vehicle in each of the coordinate frames.

In at least one example, the localization component 102 can determine a first position of the vehicle in a first coordinate frame (e.g., associated with the first instance 110) at a first time ($T_1$), which is represented by element 114. In at least one example, the localization component 102 can determine a second position of the vehicle at a second time ($T_2$), which is represented by element 116. In at least one example, the localization component 102 can compare the first position with the second position to determine a difference between the two positions (e.g., $\Delta_1$), which can represent a first amount of change ($\Delta_1$) between positions of the vehicle from the first time ($T_1$) to the second time ($T_2$) in the first coordinate frame. While only position is referenced above, the localization component 102 can additionally determine orientation information (e.g., pose), which can be associated with each position.

In at least one example, the localization component 102 can determine a first position of the vehicle in a second coordinate frame at the first time ($T_1$), which is represented by element 118. In at least one example, the localization component 102 can determine a second position of the vehicle at the second time ($T_2$), which is represented by element 120. In at least one example, the localization component 102 can compare the first position with the second position to determine a difference between the two positions (e.g., $\Delta_2$), which can represent a second amount of change ($\Delta_2$) between positions of the vehicle from the first time ($T_1$) to the second time ($T_2$) in the second coordinate frame. While only position is referenced above, the localization component 102 can additionally determine orientation information (e.g., pose), which can be associated with each position.

In at least one example, the localization component 102 can compare the first amount of change ($\Delta_1$) with the second amount of change ($\Delta_2$) to determine a difference ($\Delta_3$) between the first amount of change ($\Delta_1$) and the second amount of change ($\Delta_2$), as illustrated at operation 122. The localization component 102 can then determine whether the difference (e.g., $\Delta_3$) satisfies (e.g., is greater than or equal to) a threshold, as illustrated at operation 124. In at least one example, the threshold—which indicates an amount of inconsistency that is acceptable—can be dynamically determined based on map data, data associated with the environment, speed, a number of objects in an environment, or the like. In at least one example, if the difference (e.g., $\Delta_3$) satisfies (e.g., is greater than or equal to) the threshold, the localization component 102 can send a signal to a planner component associated with the vehicle indicating that the difference (e.g., $\Delta_3$) satisfies the threshold, as illustrated at operation 126. If the difference (e.g., $\Delta_3$) is less than the threshold, the localization component 102 can refrain from sending a signal to the planner component, as illustrated at operation 128. Additional details associated with the planner component, and handling localization error using outputs associated therewith are described below with reference to FIG. 2.

While FIG. 1 describes determining inconsistencies in pose information, as determined from multiple coordinate frames, in additional or alternative examples, inconsistencies in pose information can be determined based at least in part on using kinematic models. For example, an inconsistency in pose information can be determined by comparing current pose information with expected pose information, as determined by a kinematic model and previous pose information. If current pose information deviates by more than a threshold from the expected pose information, the localization component 102 can determine an inconsistency in pose information. Furthermore, in some examples, one or more thresholds, may be based at least in part on motion of a vehicle. As a non-limiting example, a constant threshold may be selected and/or determined based on maximum speed of a vehicle and/or a frequency with which the system determines the pose. In such an example, if the pose is determined at a frequency of 100 Hz and the vehicle is constrained to travel at no more than 65 mph, a constant threshold of 0.3 m can be used (as the vehicle should never exceed such a distance in between determinations).

Figure 2:
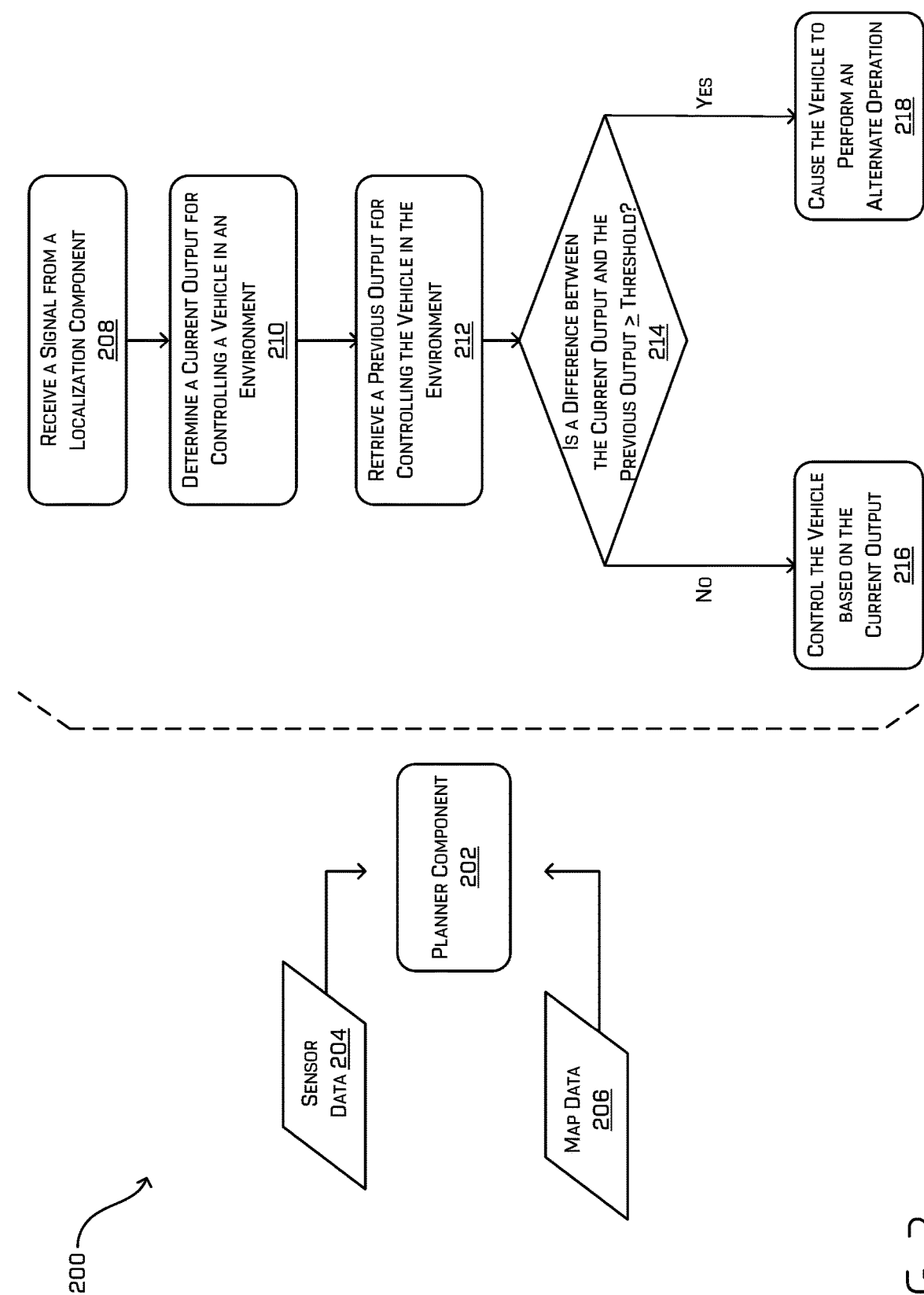
FIG. 2 illustrates an example environment for determining how to control a vehicle based at least in part on using output from a planner component of a vehicle for localization error handling, as described herein.

FIG. 2 illustrates an example environment 200 for determining how to control a vehicle based at least in part on using output from a planner component of a vehicle for localization error handling, as described herein.

In at least one example, the vehicle can be associated with a planner component 202 that can receive sensor data 204 from the sensor system(s) associated with the vehicle and/or map data 206 associated with the environment within which the vehicle is positioned. In at least one example, the planner component 202 can determine outputs to use to control the vehicle based at least in part on the sensor data 204, the map data 206, and/or any determinations made by other components associated with the vehicle (e.g., localization, perception, prediction, etc.). In at least one example, an output of the planner component 202 can include one or more instructions for causing or otherwise controlling the vehicle to travel within the environment. In some examples, the one or more instructions can include a velocity aspect, an acceleration aspect, a steering angle aspect, a navigation aspect, etc. for controlling the vehicle for a period of time (e.g., a prescribed number of seconds into the future). That is, in at least one example, the output can comprise a trajectory and/or route along which the vehicle is to drive for a period of time.

In at least one example, based at least in part on the localization component 102 determining that inconsistencies associated with pose information of the vehicle satisfy a threshold (e.g., as illustrated at operation 122 in FIG. 1) and sending a signal to the planner component 202 (as illustrated at operation 124 in FIG. 1), the planner component 202 can receive the signal from the localization component 102, as illustrated at operation 208.

In at least one example, the planner component 202 can determine a current output for controlling a vehicle in an environment, as illustrated at operation 210, based at least in part on the sensor data 204, the map data 206, and/or any determinations made by other components associated with the vehicle (e.g., localization, perception, prediction, etc.). The current output can provide instructions for controlling the vehicle from a current time to a time in the future (e.g., a future time). As a non-limiting example, an output can comprise instructions such as drive straight 10 meters at 10 meters/second and then turn right. As another non-limiting example, an output can comprise instructions such as drive straight at 20 meters/second for 10 seconds.

In at least one example, responsive to receiving a signal indicating that inconsistencies associated with pose information of the vehicle satisfy a threshold, the planner component 202 can retrieve a previous output for controlling the vehicle in the environment, as illustrated at operation 212. In at least one example, the previous output can be an output that immediately precedes the current output (e.g., the last output prior to the current output). Responsive to retrieving the previous output, the planner component 202 can compare the current output with the previous output to determine a difference between the current output and the previous output. As described above, in at least one example, such a difference can be determined in a way that aspects of the outputs that are further out in time (and/or that are further out in distance) are down-weighted (e.g., aspects can be weighted based at least in part on temporal relationships) and/or different aspects are weighted differently (e.g., weighting a turning aspect more than an acceleration aspect, weighting a position along a trajectory (e.g., longitudinal aspect) more than a position lateral (e.g., lateral aspect) to a last known trajectory). These weights can be a function of time and/or distance (linear, nonlinear, etc.), learned, or otherwise determined from experience. In at least one example, the difference can be represented by a value.

In at least one example, the planner component 202 can determine whether the difference (e.g., the value representative thereof) satisfies (e.g., is greater than or equal to) a threshold, as illustrated at operation 214. If the value is less than a threshold, the planner component 202 can determine to control the vehicle based on the current output, as illustrated at operation 216. That is, the planner component 202 can cause the vehicle to travel along a trajectory associated with the current output (e.g., without regard to the localization inconsistencies). However, if the difference is greater than or equal to the threshold, the planner component 202 can cause the vehicle to perform an alternate operation (e.g., handover to a safety driver, send a notification to a remotely-located teleoperator, perform a safety maneuver, transition from an autonomous mode to a non-autonomous mode, etc.), as illustrated at operation 218. In at least some examples, multiple thresholds can be used. As a non-limiting example, when used on an autonomous vehicle, there may be more sensitivity with respect to lateral deviations than with respect to longitudinal deviations. In such examples, a lateral threshold may be set to be lower than a longitudinal threshold.

In at least one example, the value can indicate whether there are changes in the environment of the vehicle such that the inconsistency in the pose information associated with the vehicle is relevant, and whether the vehicle should perform an operation other than controlling the vehicle based at least in part on the current output. That is, if there are significant changes in the environment of the vehicle (e.g., the value satisfies the threshold), and the pose information has significant inconsistencies (e.g., $\Delta_3$ satisfies the threshold), the planner component 202 can cause the vehicle to perform an alternate operation (e.g., other than following a current trajectory based on the current output of the planner). However, if the value is less than a threshold—indicating that the difference between outputs is small—the planner component 202 can determine not to disengage the computing device(s) of the vehicle. That is, if the vehicle is less than the threshold, the vehicle can continue to be controlled based on a current output of the planner component 202 and need not disengage its computing device(s) due to the inconsistencies identified.

Figure 3:
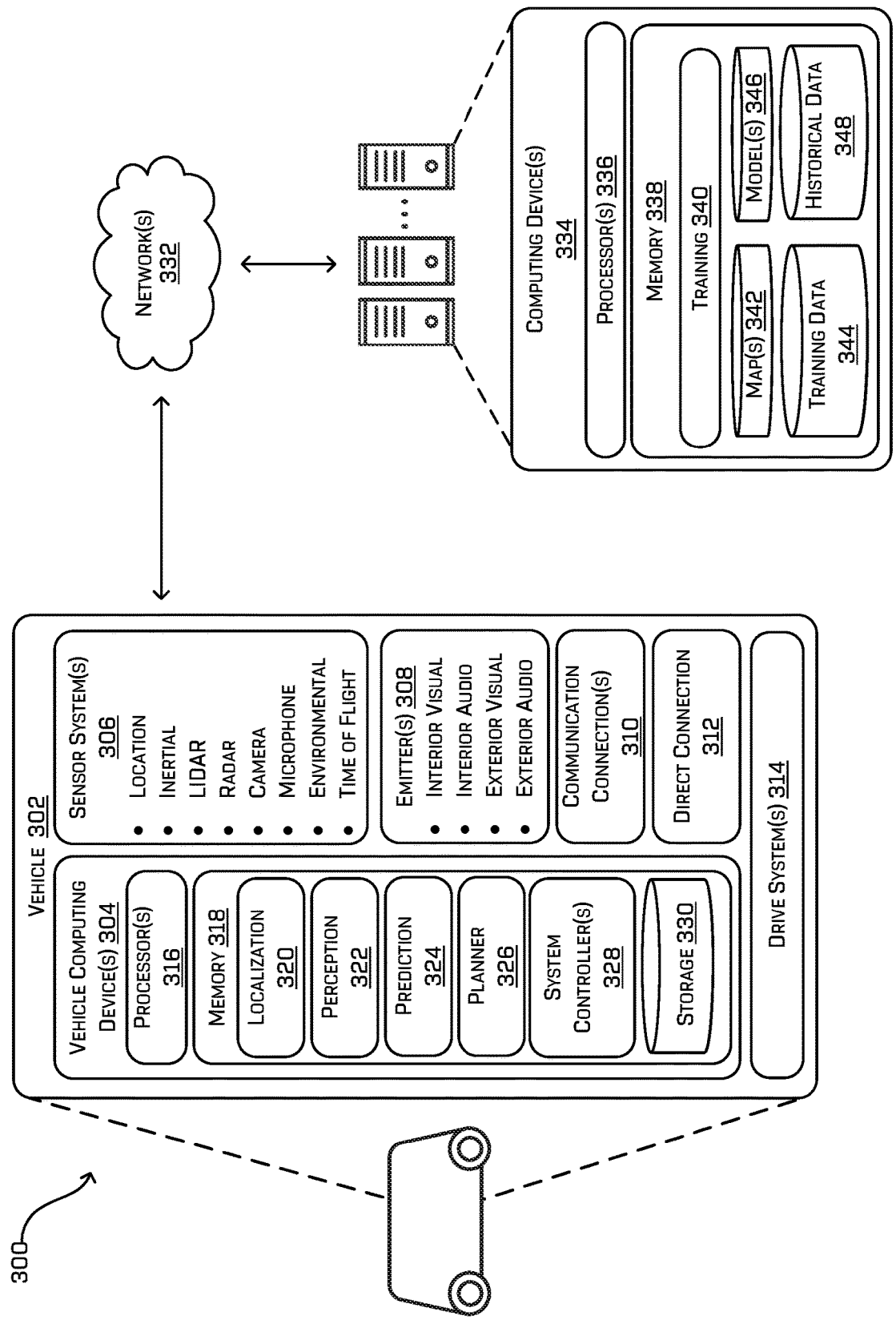
FIG. 3 is a block diagram illustrating an example system for performing techniques, as described herein.

FIG. 3 is a block diagram illustrating an example system 300 for performing techniques, as described herein. In at least one example, a vehicle 302, which can correspond to the vehicle described above with reference to FIG. 1, can include one or more vehicle computing devices 304, one or more sensor systems 306, one or more emitters 308, one or more communication connections 310, at least one direct connection 312, and one or more drive systems 314. As described above, the vehicle 302 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 302 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 302 is an autonomous vehicle; however, the vehicle 302 could be any other type of vehicle. While only a single vehicle 302 is illustrated in FIG. 3, in a practical application, the example system 300 can include a plurality of vehicles, which, in some examples, can comprise a fleet of vehicles.

The vehicle computing device(s) 304 can include processor(s) 316 and memory 318 communicatively coupled with the processor(s) 316. In the illustrated example, the memory 318 of the vehicle computing device(s) 304 stores a localization component 320 (which can correspond to the localization component 102 described above with reference to FIG. 1), a perception component 322, a prediction component 324, a planner component 326 (which can correspond to the planner component 202 described above with reference to FIG. 2), and one or more system controllers 328. Additionally, the memory 318 can include a storage 330, which can store map(s), model(s), previous outputs, etc. As described above, a map can be any number of data structures that are capable of providing information about an environment, such as, but not limited to, topologies (such as junctions, lanes, merging zones, etc.), streets, mountain ranges, roads, terrain, and the environment in general. Maps can be associated with real environments or simulated environments. Model(s) can include machine learned models, as described below. In some examples, the storage 330 can store previous outputs.

In at least one example, the localization component 320 can determine a pose (position and orientation) of the vehicle 302 in relation to a local and/or global map based at least in part on sensor data received from the sensor system(s) 306 and/or map data associated with a map (e.g., of the map(s)). In at least one example, the localization component 320 can include, or be associated with a calibration system that is capable of performing operations for calibrating (determining various intrinsic and extrinsic parameters associated with any one or more of the sensor system(s) 306), localizing, and mapping substantially simultaneously. Additional details associated with the localization component 320 are described above with reference to FIG. 1.

In at least one example, the perception component 322 can perform object detection, segmentation, and/or classification based at least in part on sensor data received from the sensor system(s) 306. In at least one example, the perception component 322 can receive raw sensor data (e.g., from the sensor system(s) 306). In at least one example, the perception component 322 can receive image data and can utilize one or more image processing algorithms to perform object detection, segmentation, and/or classification with respect to object(s) identified in the image data. In some examples, the perception component 322 can associate a bounding box (or otherwise an instance segmentation) with an identified object and can associate a confidence score associated with a classification of the identified object with the identified object. In some examples, objects, when rendered via a display, can be colored based on their perceived class. The perception component 322 can perform similar processes for one or more other modalities.

The prediction component 324 can receive sensor data from the sensor system(s) 306, map data associated with a map (e.g., of the map(s) which can be in storage 330), and/or perception data output from the perception component 322 (e.g., processed sensor data), and can output predictions associated with one or more objects within the environment of the vehicle 302. In at least one example, the planner component 326 can determine outputs, as described above, to use to control the vehicle 302 based at least in part on sensor data received from the sensor system(s) 306, map data, and/or any determinations made by the other components of the vehicle 302.

Additional details of localization systems, perception systems, prediction systems, and/or planning systems that are usable can be found in U.S. Pat. No. 9,612,123, issued on Apr. 4, 2017, and U.S. Pat. No. 10,353,390, issued on Jul. 16, 2019, the entire contents of both of which are incorporated by reference herein. In some examples (e.g., where the vehicle 302 is not an autonomous vehicle), one or more of the aforementioned systems can be omitted from the vehicle 302. While the systems described above are illustrated as "onboard" the vehicle 302, in other implementations, the systems can be remotely located and/or accessible to the vehicle 302. Furthermore, while the systems are described above as "systems," such systems can comprise one or more components for performing operations attributed to each of the systems.

In at least one example, the localization component 320, the perception component 322, the prediction component 324, and/or the planner component 326 can process sensor data, as described above, and can send their respective outputs over network(s) 332, to computing device(s) 334. In at least one example, the localization component 320, the perception component 322, the prediction component 324, and/or the planner component 326 can send their respective outputs to the computing device(s) 334 at a particular frequency, after a lapse of a predetermined period of time, in near real-time, etc.

In at least one example, the vehicle computing device(s) 304 can include one or more system controllers 328, which can be configured to control steering, propulsion, braking, safety, emitters, communication, and other systems of the vehicle 302. These system controller(s) 328 can communicate with and/or control corresponding systems of the drive system(s) 314 and/or other systems of the vehicle 302.

In at least one example, the sensor system(s) 306 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor system(s) 306 can provide input to the vehicle computing device(s) 304. In some examples, the sensor system(s) 306 can preprocess at least some of the sensor data prior to sending the sensor data to the vehicle computing device(s) 304. In at least one example, the sensor system(s) 306 can send sensor data, via the network(s) 332, to the computing device(s) 334 at a particular frequency, after a lapse of a predetermined period of time, in near real-time, etc.

The vehicle 302 can also include one or more emitters 308 for emitting light and/or sound, as described above. The emitter(s) 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 308 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 308 can be positioned at various locations about the exterior and/or interior of the vehicle 302.

The vehicle 302 can also include communication connection(s) 310 that enable communication between the vehicle 302 and other local or remote computing device(s). For instance, the communication connection(s) 310 can facilitate communication with other local computing device(s) on the vehicle 302 and/or the drive system(s) 314. Also, the communication connection(s) 310 can allow the vehicle to communicate with other nearby computing device(s) (e.g., other nearby vehicles, traffic signals, etc.). The communications connection(s) 310 also enable the vehicle 302 to communicate with a remote teleoperations computing device or other remote services.

The communications connection(s) 310 can include physical and/or logical interfaces for connecting the vehicle computing device(s) 304 to another computing device or a network, such as network(s) 332. For example, the communications connection(s) 310 can enable Wi-Fi-based communication such as via frequencies defined by the IEEE 802.11 standards, short range wireless frequencies such as BLUETOOTH, or any suitable wired or wireless communications protocol that enables the respective computing device to interface with the other computing device(s).

The direct connection 312 can directly connect the drive system(s) 314 and other systems of the vehicle 302.

In at least one example, the vehicle 302 can include drive system(s) 314. In some examples, the vehicle 302 can have a single drive system 314. In at least one example, if the vehicle 302 has multiple drive systems 314, individual drive systems 314 can be positioned on opposite ends of the vehicle 302 (e.g., the front and the rear, etc.). In at least one example, the drive system(s) 314 can include sensor system(s) to detect conditions of the drive system(s) 314 and/or the surroundings of the vehicle 302. By way of example and not limitation, the sensor system(s) can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, lidar sensors, radar sensors, etc. Some sensors, such as the wheel encoder(s), can be unique to the drive system(s) 314. In some cases, the sensor system(s) on the drive system(s) 314 can overlap or supplement corresponding systems of the vehicle 302 (e.g., sensor system(s) 306).

The drive system(s) 314 can include many of the vehicle systems, including a high voltage battery, a motor to propel the vehicle 302, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 314 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of the drive system(s) 314. Furthermore, the drive system(s) 314 also include communication connection(s) that enable communication by the respective drive module with other local or remote computing device(s).

In FIG. 3, the vehicle computing device(s) 304, sensor system(s) 306, emitter(s) 308, and the communication connection(s) 310 are shown onboard the vehicle 302. However, in some examples, the vehicle computing device(s) 304, sensor system(s) 306, emitter(s) 308, and the communication connection(s) 310 can be implemented outside of an actual vehicle (i.e., not onboard the vehicle 302).

As described above, the vehicle 302 can send sensor data to the computing device(s) 334, via the network(s) 332. In some examples, the vehicle 302 can send raw sensor data to the computing device(s) 334. In other examples, the vehicle 302 can send processed sensor data and/or representations of sensor data to the computing device(s) 334 (e.g., data output from the localization component 320, the perception component 322, the prediction component 324, and/or the planner component 326). In some examples, the vehicle 302 can send sensor data to the computing device(s) 334 at a particular frequency, after a lapse of a predetermined period of time, in near real-time, etc.

The computing device(s) 334 can receive the sensor data (raw or processed) from the vehicle 302 and/or other data collection devices, as well as data from one or more third party sources and/or systems. In at least one example, the computing device(s) 334 can include processor(s) 336 and memory 338 communicatively coupled with the processor(s) 336. In the illustrated example, the memory 338 of the computing device(s) 334 stores a training system 340, a map(s) storage 342 (e.g., storing one or more maps), a training data storage 344 (e.g., storing training data accessible to the training system 340), a model(s) storage 346 (e.g., models output by the training system 340), and a historical data storage 348 (e.g., data associated with previous outputs). In some examples, one or more of the systems and/or storage repositories can be associated with the vehicle 302 or other computing device(s) associated with the system 300 instead of, or in addition to, being associated with the memory 338 of the computing device(s) 334.

In at least one example, the training system 340 can train data model(s), which can be used for various operations as described herein. For example, machine learning algorithms for training machine learned model(s) can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), other Deep Belief Networks (DBN), Artificial Neural Network (ANN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), SVM (support vector machine), supervised learning, unsupervised learning, semi-supervised learning, etc. The resulting data model(s) can be stored in the model(s) storage 346 and/or the storage 330 on the vehicle 302 and can be accessed by in near real-time by one or more components of the vehicle computing device(s) 304.

In at least one example, the training system 340 can train a data model for determining a difference between outputs. In such an example, the training system 340 can access pairs of successive outputs and can analyze the pairs of successive outputs using machine learning algorithms. Differences in aspects of each of the outputs can be associated with a weight. In some examples, aspects of the outputs that are further out in time (and/or that are further out in distance) can be weighted differently (e.g., aspects can be weighted based at least in part on temporal relationships and/or positional relationships) and/or different aspects can be weighted differently (e.g., weighting a turning aspect more than an acceleration aspect, weighting a position along a trajectory (e.g., longitudinal aspect) more than a position lateral (e.g., lateral aspect) to a last known trajectory). In at least one example, a machine-trained data model can output a value representative of a difference between pairs of outputs. In some examples, groups of outputs can be analyzed to train a data model for determining differences between more than two outputs.

The processor(s) 316 of the vehicle 302 and the processor(s) 336 of the computing device(s) 334 can be any suitable processor capable of executing instructions to process data and perform operations as described herein. By way of example and not limitation, the processor(s) 316 and 336 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318 and 338 are examples of non-transitory computer-readable media. Memory 318 and 338 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in some examples, systems of the vehicle 302 can be associated with the computing device(s) 334 and/or the systems of the computing device(s) 334 can be associated with the vehicle 302. That is, the vehicle 302 can perform one or more of the functions associated with the computing device(s) 334, and vice versa.

Figure 4:
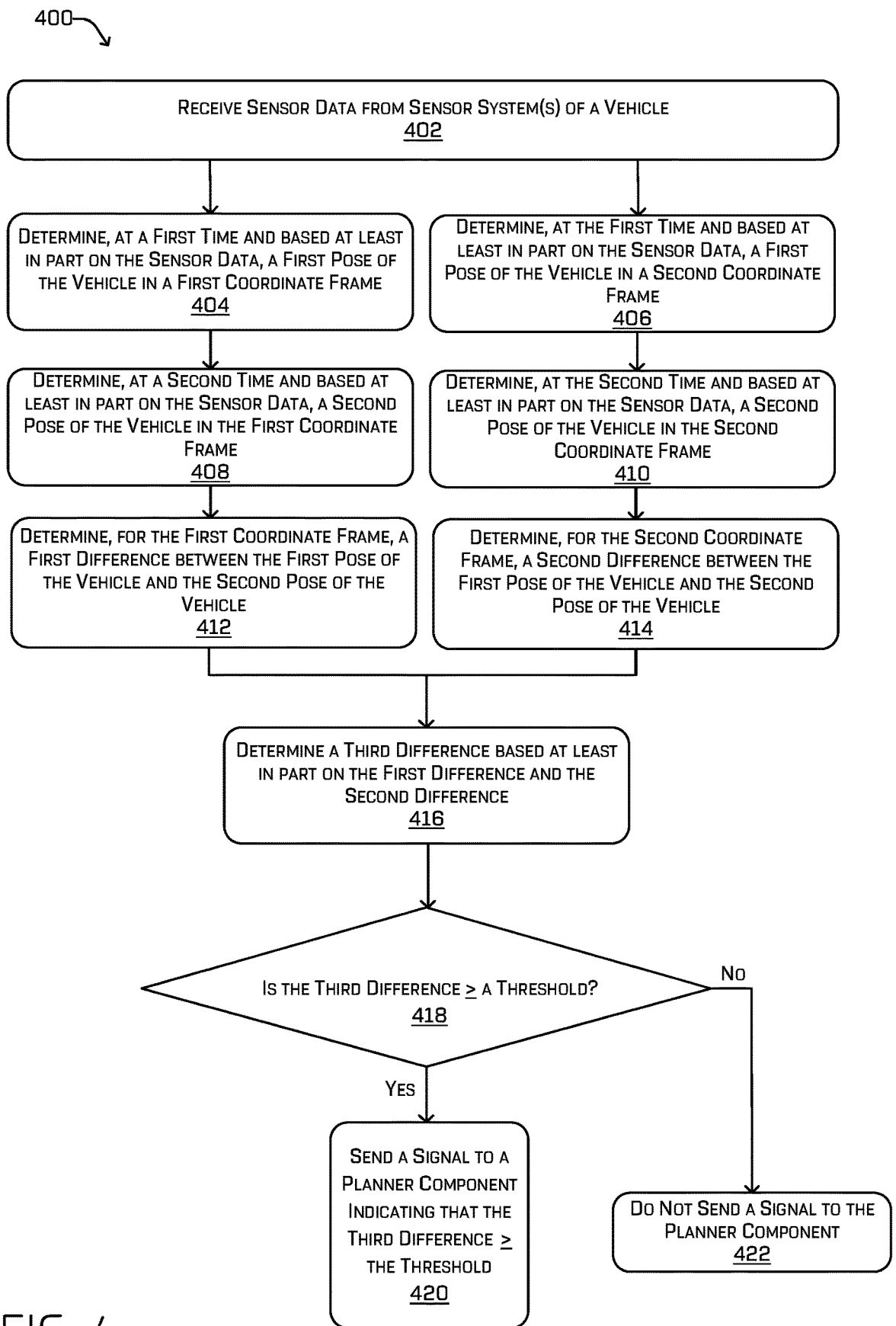
FIG. 4 illustrates an example process for determining whether to use output from a planner component of a vehicle for localization error handling, as described herein.
Figure 5:
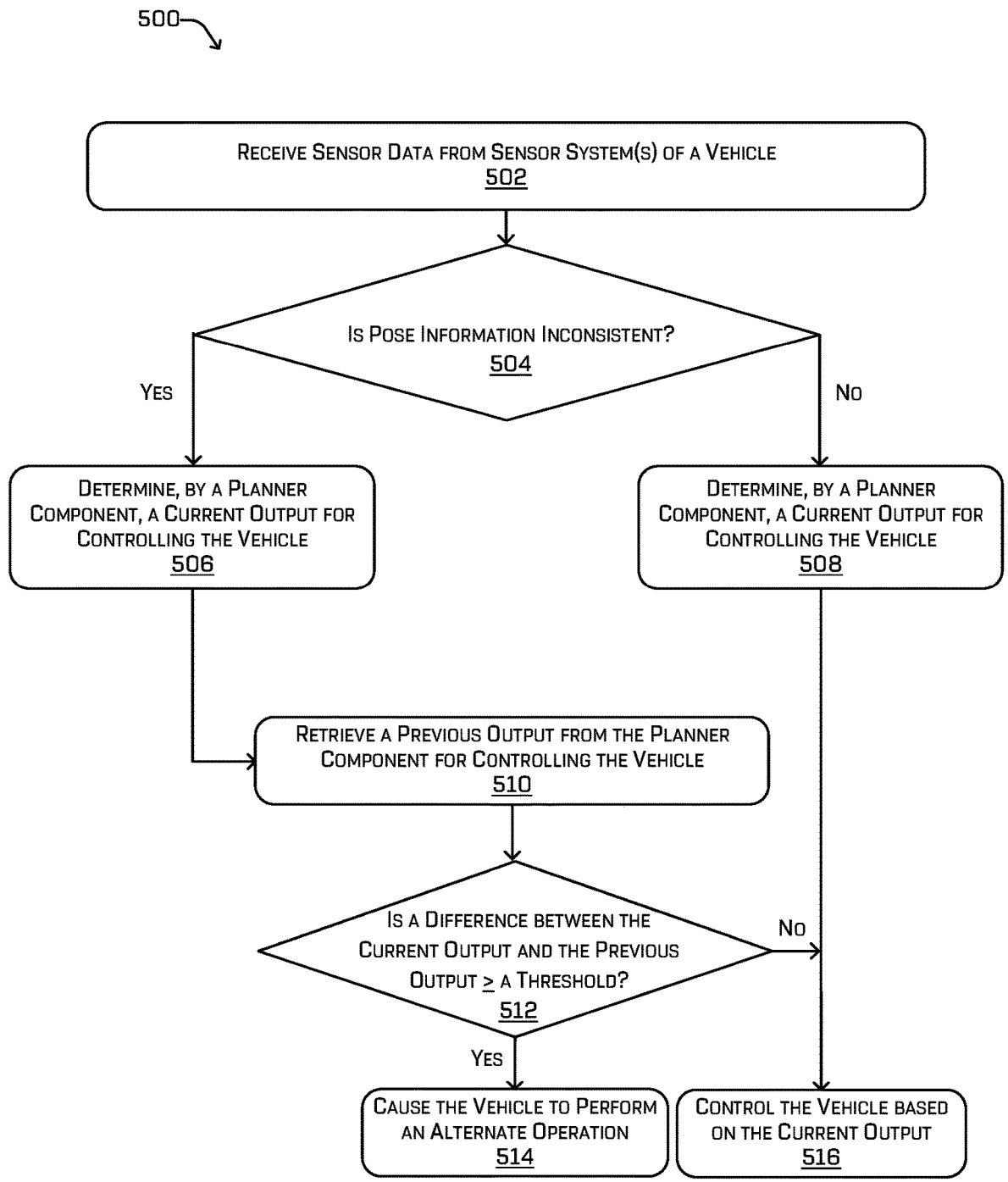
FIG. 5 illustrates an example process for determining how to control a vehicle based at least in part on using from a planner component of a vehicle for localization error handling, as described herein.

FIGS. 4 and 5 are flowcharts showing example processes involving techniques as described herein. The processes illustrated in FIGS. 4 and 5 are described with reference to the system 300 shown in FIG. 3 for convenience and ease of understanding. However, the processes illustrated in FIGS. 4 and 5 are not limited to being performed using the system 300. Moreover, the system 300 described herein is not limited to performing the processes illustrated in FIGS. 4 and 5.

The processes 400 and 500 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes 400 and 500 can be combined in whole or in part with each other or with other methods.

FIG. 4 illustrates an example process 400 for determining whether to use output from a planner component of a vehicle for localization error handling, as described herein.

At operation 402, a localization component 320 associated with a vehicle 302 can receive sensor data from sensor system(s) 306 of the vehicle 302. As described above, in at least one example, the sensor system(s) 306 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor system(s) 306 can provide input to the vehicle computing device(s) 304. In some examples, the sensor system(s) 306 can preprocess at least some of the sensor data prior to sending the sensor data to the vehicle computing device(s) 304.

At operation 404, the localization component 320 can determine, for a first coordinate frame, a first pose of the vehicle 302 at a first time. In at least one example, the process 400 can include localizing the vehicle 302 in a first coordinate frame (e.g., a local coordinate frame). For example, as the vehicle 302 traverses an environment, the vehicle 302 (e.g., via the sensor system(s) 306) can capture sensor data of the environment (e.g., lidar data, radar data, sonar data, image data, etc.) and the localization component 320 can use the sensor data in conjunction with a localization algorithm (e.g., SLAM, CLAMS, etc.) to localize the vehicle 302 in the environment. For example, the localization component 320 can compare sensor data with map data (e.g., associated with map(s) stored in the storage 330) to determine a location of the vehicle 302 in the environment.

In at least one example, the localization component 320 can determine a first pose of the vehicle 302 in the first coordinate frame at a first time. In at least one example, as described above, the localization component 320 can output pose information, which can include position and/or orientation of the vehicle 302 in the environment. As such, the first pose can be associated with a first position and first orientation, relative to the first coordinate frame.

At operation 406, the localization component 320 can determine, for a second coordinate frame, a first pose of the vehicle 302 at the first time. In at least one example, the process 400 can include localizing the vehicle 302 in a second coordinate frame (e.g., a global coordinate frame). For example, as the vehicle 302 traverses an environment, the vehicle 302 (e.g., via the sensor system(s) 306) can capture sensor data of the environment (e.g., GPS data, etc.) and the localization component 320 can use the sensor data to localize the vehicle 302 in the environment. For example, the localization component 320 can compare sensor data with map data (e.g., associated with map(s) stored in the storage 330) to determine a location of the vehicle 302 in the environment.

In at least one example, the localization component 320 can determine a first pose of the vehicle 302 in the second coordinate frame at the first time. In at least one example, as described above, the localization component 320 can output pose information, which can include position and/or orientation of the vehicle 302 in the environment. As such, the first pose can be associated with a first position and first orientation, relative to the second coordinate frame.

At operation 408, the localization component 320 can determine, for the first coordinate frame, a second pose of the vehicle 302 at a second time. In at least one example, the localization component 320 can determine a second pose of the vehicle 302 in the first coordinate frame at a second time (after the first time). As such, the second pose can be associated with a second position and second orientation, relative to the first coordinate frame.

At operation 410, the localization component 320 can determine, for the second coordinate frame, a second pose of the vehicle 302 at the second time. In at least one example, the localization component 320 can determine a second pose of the vehicle 302 in the second coordinate frame at the second time. As such, the second pose can be associated with a second position and second orientation, relative to the second coordinate frame.

At operation 412, the localization component 320 can determine, for the first coordinate frame, a first difference between the first pose of the vehicle 302 and the second pose of the vehicle 302. In at least one example, the localization component 320 can compare the first pose with the second pose to determine the first difference between the two poses, which can represent a first amount of change between poses of the vehicle 302 from the first time to the second time in the first coordinate frame.

At operation 414, the localization component 320 can determine, for the second coordinate frame, a second difference between a first pose of the vehicle 302 and a second pose of the vehicle 302. In at least one example, the localization component 320 can compare the first pose with the second pose to determine the second difference between the two poses, which can represent a second amount of change between poses of the vehicle 302 from the first time to the second time in the second coordinate frame.

At operation 416, the localization component 320 can determine a third difference based at least in part on the first difference and the second difference. That is, in at least one example, the localization component 320 can compare the first difference and the second difference to determine a third difference. The third difference can quantify the inconsistency in the pose information.

At operation 418, the localization component 320 can determine whether the third difference is greater than or equal to a threshold. In at least one example, the localization component 320 can compare the third difference with a threshold to determine whether the third difference satisfies (e.g., is greater than or equal to) the threshold. In at least one example, the threshold—which indicates an amount of inconsistency that is acceptable—can be dynamically determined based on map data, data associated with the environment, speed, a number of objects in an environment, or the like. In at least one example, a difference less than the threshold can be de minimis such that the inconsistency in pose information does not warrant consideration and/or can otherwise be resolved by the localization component 320. If the third difference satisfies (e.g., is greater than or equal to) the threshold, the localization component 320 can send a signal to a planner component 326 associated with the vehicle 302 indicating that the third difference satisfies the threshold, as illustrated at operation 420. The signal can trigger the planner component 326 of the vehicle 302 to retrieve a previous output for comparison with a current output, as described below with reference to FIG. 5.

At operation 422, the localization component 320 can refrain from sending a signal to the planner component 326. In at least one example, if the third difference is less than the threshold, the localization component 320 can refrain from sending a signal to the planner component 326. In such an example, the third difference can be de minimis such that the inconsistency in pose information does not warrant consideration and/or can otherwise be resolved by the localization component 320.

In some examples, the localization component 320 can send an indication of the difference to the planner component 326, and the planner component 326 can use the indication in determining how to control the vehicle 302. For instance, the planner component 326 can compare the difference to a threshold and determine whether the inconsistency in pose information is such to warrant comparing the current planner output to the previous planner output. That is, in some examples, the localization component 320 can send a signal indicating that the third difference warrants comparing the current planner output with the previous planner output, or the localization component 320 can provide the planner component 326 with information to make its own decision.

FIG. 5 illustrates an example process 500 for determining how to control a vehicle based at least in part on using output from a planner component of a vehicle for localization error handling, as described herein.

At operation 502, a planner component 326 associated with a vehicle 302 can receive sensor data from sensor system(s) 306 of the vehicle 302. As described above, in at least one example, the sensor system(s) 306 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor system(s) 306 can provide input to the vehicle computing device(s) 304. In some examples, the sensor system(s) 306 can preprocess at least some of the sensor data prior to sending the sensor data to the vehicle computing device(s) 304.

At operation 504, the planner component 326 can determine whether pose information is inconsistent. In at least one example, as described above with reference to FIG. 4, the localization component 320 can compare pose information to determine inconsistencies. In at least one example, based at least in part on determining that a difference between pose information is greater than or equal to a threshold, the localization component 320 can send a signal to the planner component 326. At operation 504, the planner component 326 can perform a check to determine whether such a signal has been received.

As described above, while FIG. 4 describes determining inconsistencies in pose information, as determined from multiple coordinate frames, in additional or alternative examples, inconsistencies in pose information can be determined based at least in part on using kinematic models. For example, an inconsistency in pose information can be determined by comparing current pose information with expected pose information, as determined by a kinematic model and previous pose information. If current pose information deviates by more than a threshold from the expected pose information, the localization component 320 can determine an inconsistency in pose information. Furthermore, in some examples, one or more thresholds, based at least in part on motion of a vehicle, a constant selected or determined, and the like.

At operation 506, the planner component 326 can determine a current output for controlling the vehicle 302. In at least one example, the planner component 326 can receive the sensor data from the sensor system(s) 306 and, in some examples, can access map data associated with the environment within which the vehicle 302 is positioned. In at least one example, the planner component 326 can determine outputs to use to control the vehicle 302 based at least in part on the sensor data, the map data, and/or any determinations made by other components associated with the vehicle 302 (e.g., localization, perception, prediction, etc.). In at least one example, an output of the planner component 326 can include one or more instructions for causing or otherwise controlling the vehicle 302 to travel within the environment. In some examples, the one or more instructions can include a velocity aspect, an acceleration aspect, a steering angle aspect, a navigation aspect, etc. for controlling the vehicle 302 for a period of time (e.g., a prescribed number of seconds into the future). That is, in at least one example, the output can comprise a trajectory and/or route along which the vehicle 302 is to drive for a period of time. For a current output, the output can be associated with instruction(s) for controlling the vehicle 302 from a current time to a time in the future.

At operation 508, the planner component 326 can determine a current output for controlling the vehicle 302, as illustrated at operation 506. That is, regardless of whether the planner component 326 receives an indication of inconsistency with respect to pose information, the planner component 326 can still determine a current output for controlling the vehicle 302.

At operation 510, the planner component 326 can retrieve a previous output from the planner component 326 for controlling the vehicle 302. In at least one example, based at least in part on determining an inconsistency in pose information, the planner component 326 can retrieve a previous output for controlling the vehicle 302 in the environment. In at least one example, the previous output can be an output that immediately precedes the current output (e.g., the last output prior to the current output). Responsive to retrieving the previous output, the planner component 326 can compare the current output with the previous output to determine a difference between the current output and the previous output. In at least one example, the planner component 326 can utilize machine-trained data model(s) to determine the difference, which can be stored in the storage 330 and accessible by the planner component 326 in near real-time. As described above, in at least one example, such a difference can be determined in a way that aspects of the outputs that are further out in time (and/or that are further out in distance) are down-weighted (e.g., aspects can be weighted based at least in part on temporal relationships) and/or different aspects are weighted differently (e.g., weighting a turning aspect more than an acceleration aspect, weighting a position along a trajectory (e.g., longitudinal aspect) more than a position lateral (e.g., lateral aspect) to a last known trajectory). These weights can be a function of time and/or distance (linear, nonlinear, etc.), learned, or otherwise determined from experience. In at least one example, the difference can be represented by a value.

At operation 512, the planner component 326 can determine whether a difference between the current output and the previous output is greater than or equal to a threshold. In at least one example, the planner component 326 can determine whether the difference (e.g., the value representative thereof) satisfies (e.g., is greater than or equal to) a threshold. In at least some examples, multiple thresholds can be used. As a non-limiting example, when used on an autonomous vehicle, there may be more sensitivity with respect to lateral deviations than with respect to longitudinal deviations. In such examples, a lateral threshold may be set to be lower than a longitudinal one. If the difference (e.g., value representative thereof) is greater than or equal to the threshold, the planner component 326 can cause the vehicle 302 to perform an alternate operation (e.g., other following a trajectory based on the current output), as illustrated at operation 514. In some examples, such an alternate operation can include a handover to a safety driver, sending a notification to a remotely-located teleoperator, performing a safety maneuver, transitioning from an autonomous mode to a non-autonomous mode, etc. If the difference (e.g., value representative thereof) is less than the threshold, the planner component 326 can determine to control the vehicle 302 based on the current output, as illustrated at operation 516. That is, the planner component 326 can cause the vehicle 302 to travel along a trajectory associated with the current output (e.g., without regard to the localization inconsistencies).

As described above, the value can indicate whether there are changes in the environment of the vehicle 302 such that the inconsistency in the pose information associated with the vehicle 302 is relevant, and whether the vehicle 302 should perform an operation other than controlling the vehicle 302 based at least in part on the current output. That is, if there are significant changes in the environment of the vehicle 302 (e.g., the value satisfies the threshold), and the pose information has significant inconsistencies (e.g., the "third difference" in FIG. 4 satisfies the threshold), the planner component 326 can cause the vehicle 302 to perform an alternate operation (e.g., other than following a current trajectory based on the current output of the planner). However, if the value is less than a threshold—indicating that the difference between outputs is small—the planner component 326 can determine that there is no point in disengaging the computing device(s) of the vehicle 302 until the localization component 320 can more accurately identify the pose of the vehicle 302. That is, if the vehicle 302 is less than the threshold, the vehicle 302 can continue to be controlled based on a current output of the planner component 326.

EXAMPLE CLAUSES

A. A system comprising: one or more processors; and one or more non-transitory computer-readable media that, when executed by the one or more processors, causes the system to perform operations comprising: receiving sensor data from a sensor of an autonomous vehicle; determining, based on the sensor data, an inconsistency in pose information associated with a pose of the autonomous vehicle; retrieving, based at least in part on the inconsistency, a previous output comprising first instructions for controlling the autonomous vehicle for a first period of time; determining a first difference between the previous output and a current output comprising second instructions for controlling the autonomous vehicle for a second period of time after the first period of time; determining that the first difference is greater than or equal to a first threshold; and causing, based at least in part on determining that the first difference is greater than or equal to the first threshold, the autonomous vehicle to perform an operation other than following the current output.

B. The system as paragraph A recites, wherein determining the inconsistency in the pose information comprises: determining a first amount of change between poses of the autonomous vehicle in a first coordinate frame; determining a second amount of change between poses of the autonomous vehicle in a second coordinate frame; determining a second difference between the first amount of change and the second amount of change; and determining that the second difference is greater than or equal to a second threshold.

C. The system as paragraph A or B recites, wherein: the first instructions comprise at least one of a first velocity aspect, a first acceleration aspect, a first steering angle aspect, or a first navigation aspect for the first period of time; and the second instructions comprise at least one of a second velocity aspect, a second acceleration aspect, a second steering angle aspect, or a second navigation aspect for the second period of time.

D. The system as any of claims A-C recites, wherein determining the first difference comprises weighting aspects based at least on a temporal relationship between the aspects.

E. The system as any of claims A-D recites, wherein determining the first difference comprises weighting a longitudinal aspect of the previous output and the current output different from a lateral aspect of the previous output and the current output.

F. A method comprising: receiving sensor data from a sensor associated with a vehicle; determining, based at least in part on the sensor data, a first instruction for controlling the vehicle during a first period of time; determining, based at least in part on the sensor data, a first difference in pose information associated with a pose of the vehicle; retrieving, based at least in part on the first difference, a second instruction for controlling the vehicle during a second period of time prior to the first period of time; and determining, based at least in part on comparing the first instruction with the second instruction, whether the vehicle is to follow the first instruction or perform an alternate operation.

G. The method as paragraph F recites, further comprising: comparing a first amount of change between poses of the vehicle in a first coordinate frame with a second amount of change between poses of the vehicle in a second coordinate frame; and determining the first difference based at least in part on the first amount of change and the second amount of change.

H. The method as paragraph G recites, further comprising determining that the first difference is greater than or equal to a threshold, wherein retrieving the second instruction is further based at least in part on determining that the first difference is greater than or equal to the threshold.

I. The method as paragraph G or H recites, wherein the first coordinate frame comprises a local coordinate frame and the second coordinate frame comprises a global coordinate frame.

J. The method as any of claims F-I recites, wherein: the first instruction comprises at least one of a first velocity aspect, a first acceleration aspect, a first steering angle aspect, or a first navigation aspect for the first period of time; and the second instruction comprises at least one of a second velocity aspect, a second acceleration aspect, a second steering angle aspect, or a second navigation aspect for the second period of time.

K. The method as any of claims F-J recites, further comprising: comparing the first instruction with the second instruction; and determining a second difference between the first instruction and the second instruction, wherein determining the value indicative of the second difference between the first instruction and the second instruction comprises weighting a first aspect of the first instruction and a second aspect of the second instruction, wherein the first aspect is different than the second aspect.

L. The method as paragraph K recites, further comprising: determining that the second difference is less than a threshold; and controlling, based at least in part on determining that the second difference is less than the threshold, the vehicle based at least in part on the first instruction.

M. The method as paragraph K or L recites, further comprising: determining that the second value is greater than or equal to a threshold; and causing, based at least in part on determining that the value is greater than or equal to the threshold, the vehicle to perform the alternate operation.

N. The method as any of claims K-M recites, wherein weighting the first aspect and the second aspect is based at least in part on a temporal relationship between the first aspect and the second aspect.

O. The method as any of claims F-N recites, wherein determining the first instruction along which the vehicle is to travel is further based at least in part on map data associated with the environment of the vehicle.

P. One or more non-transitory computer-readable media comprising instructions that when executed by one or more processors cause the one or more processors to perform operations comprising: receiving sensor data from a sensor associated with a vehicle; determining, based at least in part on the sensor data, a first instruction for controlling the vehicle during a first period of time; determining, based at least in part on the sensor data, a first difference in pose information associated with a pose of the vehicle; retrieving, based at least in part on determining the first difference, a second instruction for controlling the vehicle during a second period of time prior to the first period of time; and determining, based at least in part on comparing the first instruction with the second instruction, whether the vehicle is to follow the first instruction or perform an alternate operation.

Q. The one or more non-transitory computer-readable media as paragraph P recites, the operations further comprising: comparing a first amount of change between poses of the vehicle in a local coordinate frame with a second amount of change between poses of the vehicle in a global coordinate frame, wherein the first difference is based at least in part on the first amount of change and the second amount of change; determining that the first difference is greater than or equal to a threshold; and retrieving the second instruction based at least in part on determining that the first difference is greater than or equal to the threshold.

R. The one or more non-transitory computer-readable media as paragraph P or Q recites, the operations further comprising: comparing the first instruction with the second instruction; determining a value indicative of a second difference between the first instruction and the second instruction; and comparing the value with a threshold, wherein: based at least in part on determining that the value is greater than or equal to a threshold, causing the vehicle to perform the alternate operation; and based at least in part on determining that the value is less than the threshold, controlling the vehicle based at least in part on the first instruction.

S. The one or more non-transitory computer-readable media as paragraph R recites, wherein determining the value indicative of the second difference between the first instruction and the second instruction comprises weighting a first aspect of the first instruction and a second aspect of the second instruction, wherein the first aspect is different than the second aspect.

T. The one or more non-transitory computer-readable media as paragraph R or S recites, wherein the vehicle is an autonomous vehicle and the alternate operation comprises transitioning from operating in an autonomous mode to operating in a non-autonomous mode.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media that, when executed by the one or more processors, causes the system to perform operations comprising:
receiving sensor data from a sensor of an autonomous vehicle;
determining, based on the sensor data, an inconsistency in pose information associated with a pose of the autonomous vehicle;
retrieving, based at least in part on the inconsistency, a previous output comprising first instructions for controlling the autonomous vehicle for a first period of time;
determining a first difference between the previous output and a current output comprising second instructions for controlling the autonomous vehicle for a second period of time after the first period of time;
determining that the first difference is greater than or equal to a first threshold; and
causing, based at least in part on determining that the first difference is greater than or equal to the first threshold, the autonomous vehicle to perform an operation other than following the current output.

2. The system as claim 1 recites, wherein determining the inconsistency in the pose information comprises:
determining a first amount of change between poses of the autonomous vehicle in a first coordinate frame;
determining a second amount of change between poses of the autonomous vehicle in a second coordinate frame;
determining a second difference between the first amount of change and the second amount of change; and
determining that the second difference is greater than or equal to a second threshold.

3. The system as claim 1 recites, wherein:
the first instructions comprise at least one of a first velocity aspect, a first acceleration aspect, a first steering angle aspect, or a first navigation aspect for the first period of time; and
the second instructions comprise at least one of a second velocity aspect, a second acceleration aspect, a second steering angle aspect, or a second navigation aspect for the second period of time.

4. The system as claim 1 recites, wherein determining the first difference comprises weighting aspects based at least on a temporal relationship between the aspects.

5. The system as claim 1 recites, wherein determining the first difference comprises weighting a longitudinal aspect of the previous output and the current output different from a lateral aspect of the previous output and the current output.

6. A method comprising:
receiving sensor data from a sensor associated with a vehicle;
determining, based at least in part on the sensor data, a first instruction for controlling the vehicle during a first period of time;
determining, based at least in part on the sensor data, a first difference in pose information associated with a pose of the vehicle;
retrieving, based at least in part on the first difference, a second instruction for controlling the vehicle during a second period of time prior to the first period of time; and
determining, based at least in part on comparing the first instruction with the second instruction, whether the vehicle is to follow the first instruction or perform an alternate operation.

7. The method as claim 6 recites, further comprising:
comparing a first amount of change between poses of the vehicle in a first coordinate frame with a second amount of change between poses of the vehicle in a second coordinate frame; and
determining the first difference based at least in part on the first amount of change and the second amount of change.

8. The method as claim 7 recites, further comprising determining that the first difference is greater than or equal to a threshold,
wherein retrieving the second instruction is further based at least in part on determining that the first difference is greater than or equal to the threshold.

9. The method as claim 7 recites, wherein the first coordinate frame comprises a local coordinate frame and the second coordinate frame comprises a global coordinate frame.

10. The method as claim 6 recites, wherein:
the first instruction comprises at least one of a first velocity aspect, a first acceleration aspect, a first steering angle aspect, or a first navigation aspect for the first period of time; and
the second instruction comprises at least one of a second velocity aspect, a second acceleration aspect, a second steering angle aspect, or a second navigation aspect for the second period of time.

11. The method as claim 6 recites, further comprising:
comparing the first instruction with the second instruction; and
determining a second difference between the first instruction and the second instruction, wherein determining the second difference between the first instruction and the second instruction comprises weighting a first aspect of the first instruction and a second aspect of the second instruction, wherein the first aspect is different than the second aspect.

12. The method as claim 11 recites, further comprising:
determining that the second difference is less than a threshold; and
controlling, based at least in part on determining that the second difference is less than the threshold, the vehicle based at least in part on the first instruction.

13. The method as claim 11 recites, further comprising:
determining that the second difference is greater than or equal to a threshold; and
causing, based at least in part on determining that the second difference is greater than or equal to the threshold, the vehicle to perform the alternate operation.

14. The method as claim 11 recites, wherein weighting the first aspect and the second aspect is based at least in part on a temporal relationship between the first aspect and the second aspect.

15. The method as claim 6 recites, wherein determining the first instruction by which the vehicle is to travel is further based at least in part on map data associated with an environment of the vehicle.

16. One or more non-transitory computer-readable media comprising instructions that when executed by one or more processors cause the one or more processors to perform operations comprising:
receiving sensor data from a sensor associated with a vehicle;

determining, based at least in part on the sensor data, a first instruction for controlling the vehicle during a first period of time;

determining, based at least in part on the sensor data, a first difference in pose information associated with a pose of the vehicle;

retrieving, based at least in part on determining the first difference, a second instruction for controlling the vehicle during a second period of time prior to the first period of time; and determining, based at least in part on comparing the first instruction with the second instruction, whether the vehicle is to follow the first instruction or perform an alternate operation.

17. The one or more non-transitory computer-readable media as claim 16 recites, the operations further comprising:

comparing a first amount of change between first poses of the vehicle in a local coordinate frame with a second amount of change between second poses of the vehicle in a global coordinate frame, wherein the first difference is based at least in part on the first amount of change and the second amount of change;

determining that the first difference is greater than or equal to a threshold; and retrieving the second instruction based at least in part on determining that the first difference is greater than or equal to the threshold.

18. The one or more non-transitory computer-readable media as claim 16 recites, the operations further comprising:

comparing the first instruction with the second instruction;

determining a value indicative of a second difference between the first instruction and the second instruction; and comparing the value with a threshold, wherein:
based at least in part on determining that the value is greater than or equal to the threshold, causing the vehicle to perform the alternate operation; and
based at least in part on determining that the value is less than the threshold, controlling the vehicle based at least in part on the first instruction.

19. The one or more non-transitory computer-readable media as claim 18 recites, wherein determining the value indicative of the second difference between the first instruction and the second instruction comprises weighting a first aspect of the first instruction and a second aspect of the second instruction, wherein the first aspect is different than the second aspect.

20. The one or more non-transitory computer-readable media as claim 18 recites, wherein the vehicle is an autonomous vehicle and the alternate operation comprises transitioning from operating in an autonomous mode to operating in a non-autonomous mode.

* * * * *